(12) United States Patent
Morioka et al.

(10) Patent No.: US 10,627,586 B2
(45) Date of Patent: Apr. 21, 2020

(54) OPTICAL RECEPTACLE, OPTICAL MODULE, AND METHOD FOR MANUFACTURING OPTICAL MODULE

(71) Applicant: Enplas Corporation, Saitama (JP)

(72) Inventors: Shimpei Morioka, Saitama (JP); Takafumi Kunitani, Saitama (JP)

(73) Assignee: Enplas Corporation, Saitama (JP)

( * ) Notice: Subject to any disclaimer, the term of this patent is extended or adjusted under 35 U.S.C. 154(b) by 0 days.

(21) Appl. No.: 16/465,194

(22) PCT Filed: Nov. 22, 2017

(86) PCT No.: PCT/JP2017/041937
§ 371 (c)(1),
(2) Date: May 30, 2019

(87) PCT Pub. No.: WO2018/101137
PCT Pub. Date: Jun. 7, 2018

(65) Prior Publication Data
US 2020/0003972 A1    Jan. 2, 2020

(30) Foreign Application Priority Data
Nov. 30, 2016  (JP) .................................. 2016-232527

(51) Int. Cl.
*G02B 6/42*    (2006.01)
(52) U.S. Cl.
CPC ......... *G02B 6/4239* (2013.01); *G02B 6/4206* (2013.01); *G02B 6/4214* (2013.01); *G02B 6/4246* (2013.01); *G02B 6/4292* (2013.01)
(58) Field of Classification Search
CPC .................................................. G02B 6/4239
See application file for complete search history.

(56) References Cited

U.S. PATENT DOCUMENTS 7,614,802 B2 *  11/2009  Morioka .............. G02B 6/4292
                                              385/88
9,035,234 B2 *  5/2015  Wu ........................ H01L 31/12
                                              250/239

(Continued)

FOREIGN PATENT DOCUMENTS

JP    2004-246279    9/2004

OTHER PUBLICATIONS

International Search Report from International Application No. PCT/JP2017/041937 dated Jan. 30, 2018.

*Primary Examiner* — Rhonda S Peace
(74) *Attorney, Agent, or Firm* — Brundidge & Stanger, P.C.

(57) ABSTRACT

An optical receptacle, having an optical receptacle body and a support member. The optical receptacle body is in contact with the support member through a first contact surface, a second contact surface, and a third contact surface. The support member has a second fitting part fitting with a first fitting part disposed on the first contact surface of the optical receptacle body. The optical receptacle body is adhered to the support member by an adhesive disposed inside an adhesion recess on the support member and an adhesion through-hole in the optical receptacle body, with the optical receptacle body being set away from a virtual plane including an installation surface for the support member. The adhesion through-hole opens onto the third contact surface of the optical receptacle body and the surface of the optical receptacle body on the opposite side from the third contact surface.

7 Claims, 9 Drawing Sheets

(56) References Cited

U.S. PATENT DOCUMENTS

| | | | |
|---|---|---|---|
| 9,939,594 B2 * | 4/2018 | Morioka | G02B 6/4214 |
| 2004/0202477 A1 | 10/2004 | Nagasaka et al. | |
| 2008/0247713 A1 * | 10/2008 | Tamura | G02B 6/4206 |
| | | | 385/93 |
| 2009/0154877 A1 * | 6/2009 | Morioka | G02B 6/4204 |
| | | | 385/39 |
| 2013/0266260 A1 * | 10/2013 | Morioka | G02B 6/4214 |
| | | | 385/33 |
| 2015/0016772 A1 * | 1/2015 | Arao | G02B 6/4273 |
| | | | 385/14 |
| 2016/0334592 A1 * | 11/2016 | McColloch | G02B 6/4246 |
| 2017/0218786 A1 * | 8/2017 | Eldrid | F01D 11/001 |

* cited by examiner

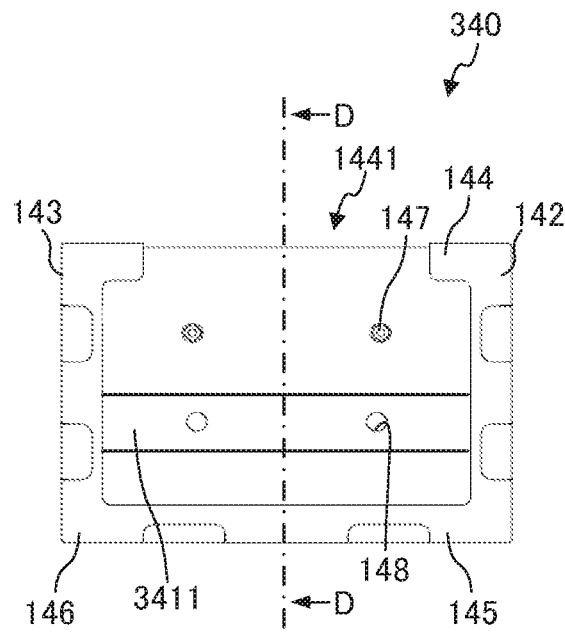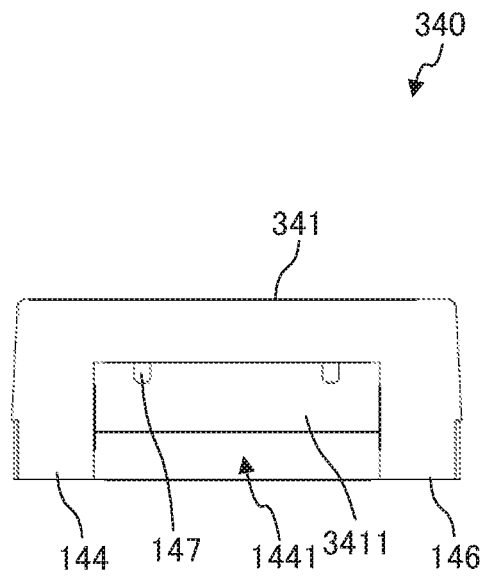
FIG. 9A  FIG. 9B
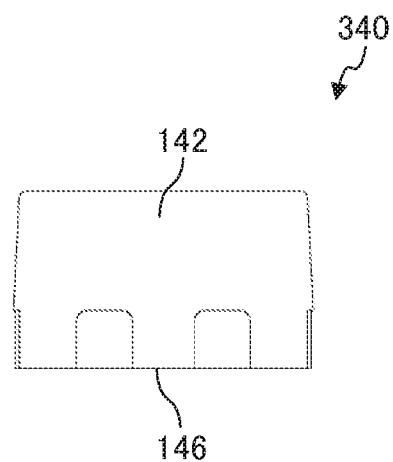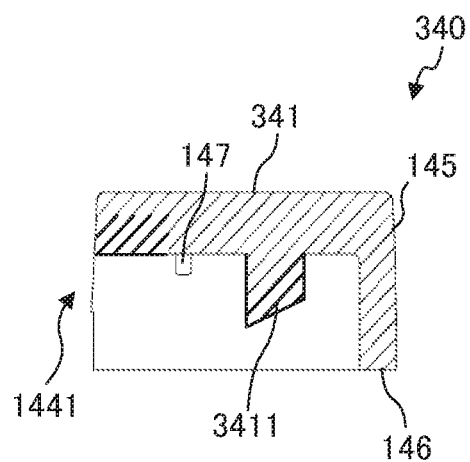
FIG. 9C  FIG. 9D

OPTICAL RECEPTACLE, OPTICAL MODULE, AND METHOD FOR MANUFACTURING OPTICAL MODULE

TECHNICAL FIELD

The present invention relates to an optical receptacle, an optical module including the optical receptacle, and a method for producing the optical module.

BACKGROUND ART

Conventionally, in optical communications using an optical transmission member such as an optical fiber, an optical waveguide, and/or the like, an optical module including a light-emitting element (hereinafter, also referred to as "optical element") such as a surface-emitting laser (e.g., a vertical cavity surface emitting laser (VCSEL)) has been used. Such an optical module includes an optical receptacle (hereinafter, also referred to as "optical socket") that allows, to enter the optical transmission member, light containing communication information and being emitted by the light-emitting element (see, e.g., Patent Literature (hereinafter referred to as "PTL") 1).

An optical module disclosed in PTL 1 includes a transparent substrate, an optical socket that is disposed on one surface of the transparent substrate and that is for optically coupling together an optical element and an end surface of an optical transmission member, and the optical element disposed on the other surface of the transparent substrate at a position corresponding to the optical socket. The optical socket and the optical element are adhered directly to the transparent substrate. An optical plug provided at one end of the optical transmission member is attached to the optical socket. In the optical module disclosed in PTL 1, the light-emitting surface of the optical element faces the transparent substrate, so that inconvenience such as damage to the light-emitting surface, adhesion of an extraneous matter to the light-emitting surface, and/or the like can be reduced.

CITATION LIST

Patent Literature

PTL 1
Japanese Patent Application Laid-Open No. 2004-246279

SUMMARY OF INVENTION

Technical Problem

However, in the optical module disclosed in PTL 1, there has been a problem in that, since the optical socket is directly adhered to the substrate, a region of the substrate for wire bonding and a region of the substrate for other optical components, electronic components, and/or the like to be disposed are restricted. Since the optical plug provided at one end of the optical transmission member is directly attached to the optical socket, stresses caused during attachment or detachment of the optical transmission member or during use of the optical module may be transmitted to the optical socket via the optical plug. Such stresses result in another problem in that the position of the optical socket shifts or the optical socket comes off.

An object of the present invention is to secure a region of a substrate for wire bonding and a region of the substrate for other optical components, electronic components, and/or the like to be disposed, so as to increase the design flexibility, and is also to make it unlikely for the position of an optical-receptacle main body to shift and for the optical-receptacle main body to come off by stresses caused during attachment or detachment of an optical transmission member or during use of an optical module.

Solution to Problem

An optical receptacle according to the present invention is an optical receptacle to be disposed between a photoelectric conversion device and an optical transmission member, the photoelectric conversion device including a substrate and a photoelectric conversion element disposed on the substrate, the optical receptacle being configured to optically couple together the photoelectric conversion element and an end surface of the optical transmission member, the optical receptacle including: an optical-receptacle main body that includes a first contacting surface, a second contacting surface, and a third contacting surface disposed sequentially from a side of a surface of the optical-receptacle main body facing the end surface of the optical transmission member; and a supporting member that supports the optical-receptacle main body while being in contact with the first contacting surface, the second contacting surface, and the third contacting surface. The optical-receptacle main body includes: a first optical surface that allows incidence of transmission light emitted by the photoelectric conversion element, or emits, toward the photoelectric conversion element, reception light that has been emitted from the end surface of the optical transmission member and has passed through an inside of the optical-receptacle main body, a second optical surface that emits, toward the optical transmission member, the transmission light that has been emitted by the photoelectric conversion element and has passed through the inside of the optical-receptacle main body, or allows incidence of the reception light emitted from the optical transmission member, a reflective surface that reflects, toward the second optical surface, the transmission light incident on the first optical surface, or reflects, toward the first optical surface, the reception light incident on the second optical surface, a first fitting portion disposed in or on the first contacting surface, and an adhesion through hole that is open in the third contacting surface and in a surface of the optical-receptacle main body located opposite the third contacting surface. The first contacting surface and the third contacting surface are disposed opposite a surface of the optical-receptacle main body on which the first optical surface is disposed. The second contacting surface is disposed opposite a surface of the optical-receptacle main body on which the second optical surface is disposed. The supporting member includes: an installation surface for installation on the substrate, a second fitting portion disposed on or in a surface of the supporting member facing the first contacting surface, the second fitting portion being fitted in or to the first fitting portion, and an adhesion recess that is open in a surface of the supporting member facing the third contacting surface, the adhesion recess communicating with the adhesion through hole. The optical-receptacle main body is adhered, via an adhesive disposed inside the adhesion through hole and the adhesion recess, to the supporting member to be spaced apart from an imaginary plane including the installation surface.

An optical module according to the present invention includes: a photoelectric conversion device including a substrate and a photoelectric conversion element disposed on the substrate; and the optical receptacle according to the present invention, in which the substrate and the optical-receptacle main body are spaced apart from each other.

A method for producing the optical module according to the present invention includes: adhering the optical-receptacle main body and the supporting member to each other by injecting an adhesive inside the adhesion through hole and the adhesion recess, and curing the adhesive, with the optical-receptacle main body being in contact with the supporting member at the first contacting surface, the second contacting surface, and the third contacting surface; and fixing the optical receptacle and the substrate to each other, with the substrate and the optical-receptacle main body being spaced apart from each other.

Advantageous Effects of Invention

According to the present invention, it is possible to secure the region of the substrate for wire bonding and the region of the substrate for other optical components, electronic components, and/or the like to be disposed, so as to increase the design flexibility, and it is also possible to make it unlikely for the position of the optical-receptacle main body to shift and for the optical-receptacle main body to come off by stresses caused during attachment or detachment of the optical transmission member during use of the optical module.

BRIEF DESCRIPTION OF DRAWINGS

FIGS. 9A to 9D illustrate a configuration of a supporting member according to Embodiment 3.

DESCRIPTION OF EMBODIMENTS

Hereinafter, an optical module according to an embodiment of the invention will be described in detail with reference to the attached drawings.

Embodiment 1

(Configuration of Optical Module)

Figure 1:
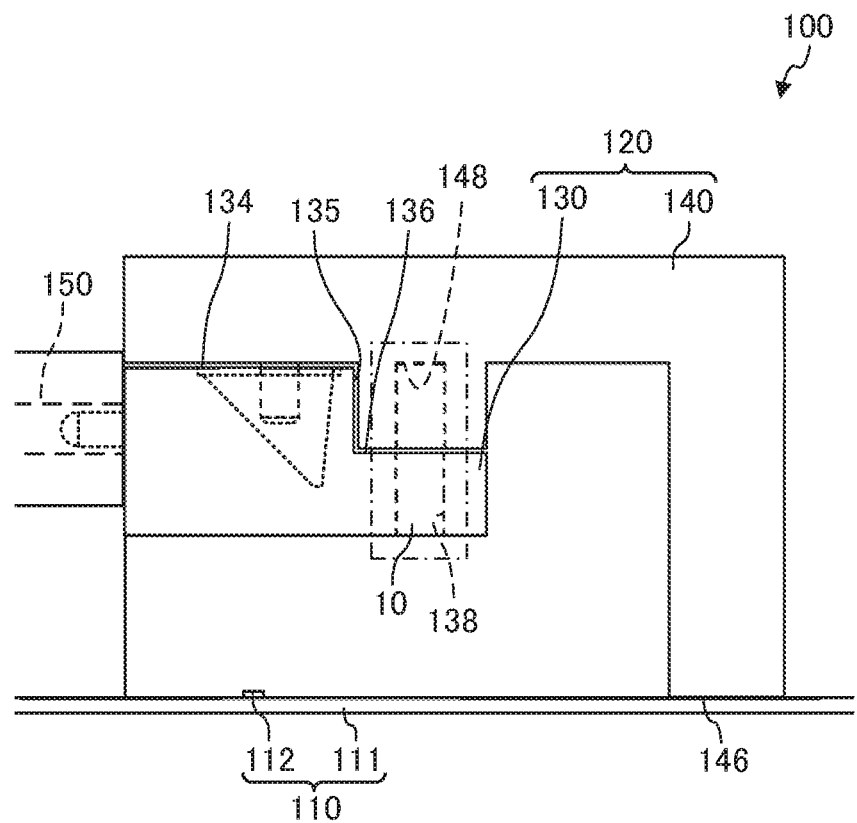
FIG. 1 is a schematic side view illustrating a configuration of an optical module according to Embodiment 1.

FIG. 1 is a schematic side view illustrating a configuration of optical module 100 according to Embodiment 1. More specifically, FIG. 1 is a right side view of optical module 100 as seen from the inside of supporting member 140. As illustrated in FIG. 1, optical module 100 includes photoelectric conversion device 110 and optical receptacle 120. Optical receptacle 120 includes optical-receptacle main body 130 and supporting member 140.

When optical module 100 is used, optical transmission member 150 is connected to optical module 100. The type of optical transmission member 150 is not limited specifically, but may be appropriately selected as needed. Examples of the type of optical transmission member 150 include an optical fiber and an optical waveguide. Optical transmission member 150 is an optical fiber in the present embodiment. The optical fiber may be of a single mode type, or a multiple mode type. The number of optical transmission members 150 is not limited specifically, but may be appropriately selected as needed. In the present embodiment, twelve optical fibers are arranged at regular intervals in the depth direction of a drawing sheet of FIG. 1. Note that, optical transmission members 150 may also be arranged in two or more rows.

Photoelectric conversion device 110 converts between an optical signal and an electrical signal in optical module 100. Photoelectric conversion device 110 includes substrate 111 and photoelectric conversion element 112.

Substrate 111 supports photoelectric conversion element 112 and supporting member 140. Examples of substrate 111 include a glass composite substrate, glass epoxy substrate, and flexible printed circuit board.

Photoelectric conversion element 112 is disposed on substrate 111. Photoelectric conversion element 112 is a light-emitting element or a light-receiving element. In optical module 100 for transmission, the light-emitting element is used as photoelectric conversion element 112. In optical module 100 for reception, the light-receiving element is used as photoelectric conversion element 112. In optical module 100 for transmission and reception, the light-emitting element and the light-receiving element are used as photoelectric conversion elements 112. Optical module 100 according to the present embodiment is an optical module for transmission and reception that is for both of transmission of light to an end surface of optical transmission member 150 and reception of light from the end surface of optical transmission member 150. That is, photoelectric conversion device 110 includes the light-emitting element and the light-receiving element as photoelectric conversion elements 112.

The light-emitting element emits light in the vertical direction (normal line direction) to the surface of substrate 111 on which the light-emitting element is disposed. The number of light-emitting elements is not limited specifically, but may be appropriately set as needed. For example, the number of light-emitting elements is two, four, six, eight, or twelve. Six light-emitting elements are provided in the present embodiment. The light-emitting elements are disposed on substrate 111 at positions where the light-emitting elements face first optical surfaces 131 (described later) of optical-receptacle main body 130. The six light-emitting elements are arranged at regular intervals in the arrangement direction in which first optical surfaces 131 and optical transmission members 150 are arranged (the arrangement direction is the depth direction of the drawing sheet of FIG. 1). More specifically, the six light-emitting elements are arranged to be located on the same straight line. Note that, when optical transmission members 150 are arranged in two or more rows, the number of rows of the arranged light-emitting elements may be identical to that of optical transmission members 150. Examples of the light-emitting elements include a vertical cavity surface emitting laser (VCSEL).

The light-receiving element receives reception light emitted from the end surfaces of optical transmission members 150. The number of light-receiving elements is also not limited specifically, but may be appropriately set as needed. For example, the number of light-receiving elements is two, four, six, eight, or twelve. Six light-receiving elements are provided in the present embodiment. The light-receiving elements are also disposed at positions where the light-receiving elements face first optical surfaces 131 of optical-receptacle main body 130. The six light-receiving elements are arranged at regular intervals in the arrangement direction in which first optical surfaces 131 and optical transmission members 150 are arranged (the arrangement direction is the depth direction of the drawing sheet of FIG. 1) in the present embodiment. More specifically, the six light-receiving elements are arranged to be located on the same straight line. Note that, when optical transmission members 150 are arranged in two or more rows, the number of rows of the arranged light-receiving elements may be identical to that of optical transmission members 150. The light-receiving elements are, for example, a photodiode.

Figure 2A:
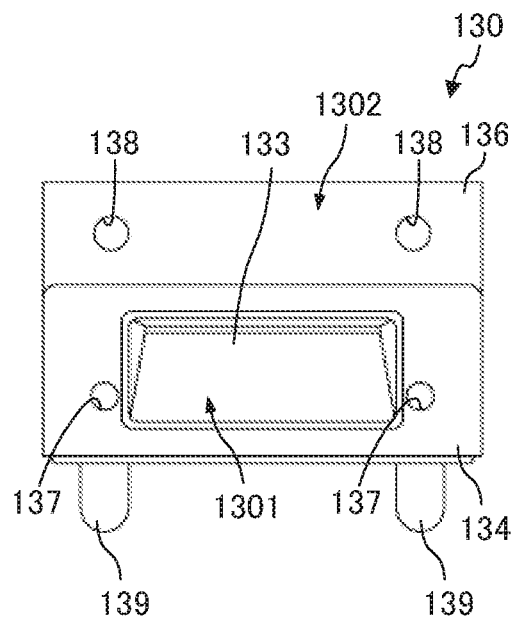
FIGS. 2A to 2D illustrate a configuration of an optical-receptacle main body according to Embodiment 1.
Figure 2B:
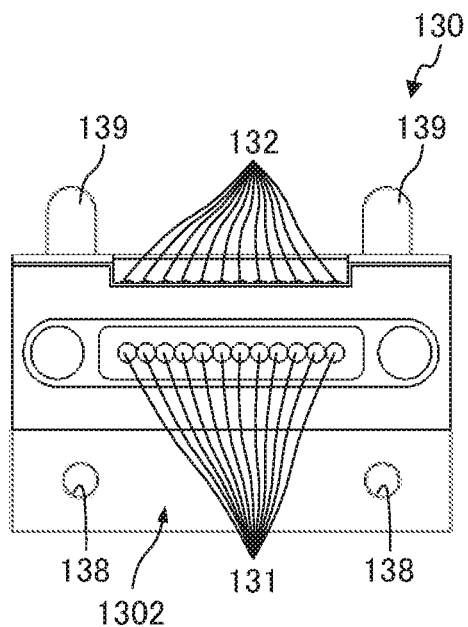
Figure 2C:
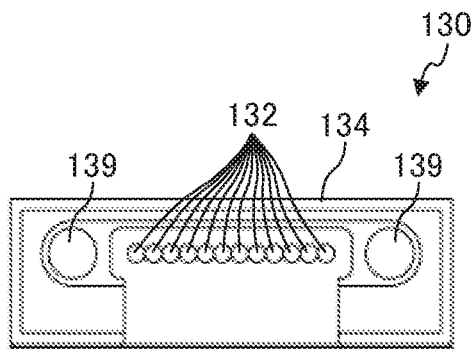
Figure 2D:
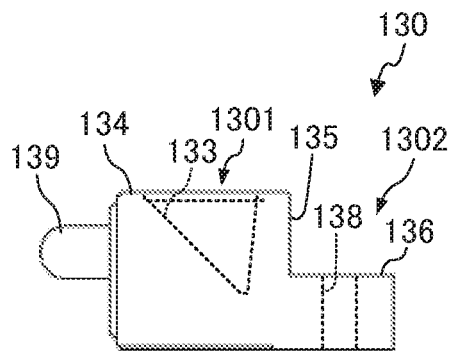

FIGS. 2A to 2D illustrate the configuration of optical-receptacle main body 130. FIG. 2A is a plan view of optical-receptacle main body 130, FIG. 2B is a bottom view of optical-receptacle main body 130, FIG. 2C is a front view of optical-receptacle main body 130, and FIG. 2D is a right side view of optical-receptacle main body 130. Note that, hereinafter, descriptions will be given in which a surface of optical-receptacle main body 130 facing the end surfaces of optical transmission members 150 is regarded as the front surface of optical-receptacle main body 130 (see FIG. 1).

Optical-receptacle main body 130 optically couples together photoelectric conversion elements 112 and the end surfaces of optical transmission members 150 when disposed between photoelectric conversion device 110 and optical transmission members 150. In the present embodiment, optical-receptacle main body 130 optically couples together the six light-emitting elements and the end surfaces of six of optical transmission members 150, respectively, and also optically couples together the six light-receiving elements and the end surfaces of six of optical transmission members 150, respectively.

As illustrated in FIGS. 2A to 2D, optical-receptacle main body 130 is a member having a substantially rectangular parallelepiped shape. In the present embodiment, first recess 1301 and second recess 1302 are formed in the top surface of optical-receptacle main body 130 sequentially from the side of the front surface of optical-receptacle main body 130. First recess 1301 has substantially pentagonal prism shape, and second recess 1302 has a substantially quadrangular prism shape. First recess 1301 and second recess 1302 are formed in the top surface of optical-receptacle main body 130 so as to be spaced apart from each other. That is, a wall is formed between first recess 1301 and second recess 1302.

Optical-receptacle main body 130 is optically transparent. Optical-receptacle main body 130 allows the transmission light emitted by the light-emitting elements to be emitted toward the end surfaces of optical transmission members 150 and also allows the reception light emitted from the end surfaces of optical transmission members 150 to be emitted toward the light-receiving elements. Optical-receptacle main body 130 is formed using a material optically transparent to the light of wavelengths used for optical communications (transmission light and reception light). Examples of the material of optical-receptacle main body 130 include polyetherimide (PEI) and cyclic olefin resin.

Optical-receptacle main body 130 includes twelve first optical surfaces 131, twelve second optical surfaces 132, reflective surface 133, first contacting surface 134, second contacting surface 135, third contacting surface 136, two first fitting portions 137, two adhesion through holes 138, and two ferrule protrusions 139. First contacting surface 134, second contacting surface 135, and third contacting surface 136 are disposed sequentially from the side of the front surface of optical-receptacle main body 130 facing the end surfaces of optical transmission members 150. The right half of optical-receptacle main body 130 in each of FIGS. 2A to 2C functions as optical-receptacle main body 130 for transmission, and the left half of optical-receptacle main body 130 in each of FIGS. 2A to 2C functions as optical-receptacle main body 130 for reception.

As illustrated in FIG. 1, optical-receptacle main body 130 is adhered to supporting member 140 via adhesive 10 disposed inside adhesion through holes 138 and adhesion recesses 148 such that optical-receptacle main body 130 is in contact with supporting member 140 at first contacting surface 134, second contacting surface 135, and third contacting surface 136 and is spaced apart from an imaginary plane (surface of substrate 111) including installation surface 146 of supporting member 140. Note that, "adhesive" as used herein includes both an adhesive before being cured and an adhesive after being cured (cured object).

First optical surfaces 131 are optical surfaces which allow, to enter the inside of optical-receptacle main body 130, the transmission light emitted by the light-emitting elements. First optical surfaces 131 are also optical surfaces which allow, to be emitted toward the light-receiving elements, the reception light emitted from the end surfaces of optical transmission members 150 and having passed through the inside of optical-receptacle main body 130.

As for the shape of first optical surfaces 131, first optical surfaces 131 are convex lens surfaces that are convex toward photoelectric conversion elements 112 in the present embodiment. First optical surfaces 131 convert, into collimated light, the transmission light emitted by the light-emitting elements. First optical surfaces 131 converge the reception light emitted from optical transmission members 150 and having passed through the inside of optical-receptacle main body 130. Additionally, each of first optical surfaces 131 is circular in plan view.

Twelve first optical surfaces 131 are provided in the present embodiment. First optical surfaces 131 are disposed on the bottom surface of a recess formed in the bottom surface of optical-receptacle main body 130. Twelve first optical surfaces 131 are arranged in the arrangement direction in which photoelectric conversion elements 112 (six light-emitting elements and six light-receiving elements) are arranged, so as to face twelve photoelectric conversion elements 112, respectively. It is preferable that the central axes (optical axes) of first optical surfaces 131 be orthogonal to the photoelectric conversion surfaces of photoelectric conversion elements 112, respectively. It is also preferable that the central axes (optical axes) of first optical surfaces 131 coincide respectively with the optical axes of rays of the transmission light emitted by the light-emitting elements and with the optical axes of rays of the reception light incident on the light-receiving elements. Note that, when photoelectric conversion elements 112 and optical transmission members 150 are arranged in two or more rows, the number of rows of arranged first optical surfaces 131 is identical to those of photoelectric conversion elements 112 and optical transmission members 150.

In the present embodiment, six of twelve first optical surfaces 131 on the right side in FIG. 2B are used as first optical surfaces 131 for transmission, and six of twelve first optical surfaces 131 on the left side are used as first optical surfaces 131 for reception. The transmission light from the light-emitting elements is incident on first optical surfaces 131 for transmission to enter the inside of optical-receptacle main body 130, and the reception light having passed through the inside of optical-receptacle main body 130 is emitted from first optical surfaces 131 for reception.

Second optical surfaces 132 are optical surfaces which allow, to be emitted toward the end surfaces of optical transmission members 150, the transmission light emitted by the light-emitting elements and having passed through the inside of optical-receptacle main body 130. Second optical surfaces 132 are also optical surfaces which allow, to enter the inside of optical-receptacle main body 130, the reception light emitted from the end surfaces of optical transmission members 150.

As for the shape of second optical surfaces 132, second optical surfaces 132 are convex lens surfaces that are convex toward the end surfaces of optical transmission members 150 in the present embodiment. Second optical surfaces 132 converge the transmission light having passed through the inside of optical-receptacle main body 130 toward the end surfaces of optical transmission members 150. Second optical surfaces 132 also convert, into collimated light, the reception light emitted from the end surfaces of optical transmission members 150. Additionally, each of second optical surfaces 132 is circular in plan view.

Twelve second optical surfaces 132 are provided in the present embodiment. Second optical surfaces 132 are disposed on the bottom surface of a recess formed in the front surface of optical-receptacle main body 130. Twelve second optical surfaces 132 are arranged in the arrangement direction in which optical transmission members 150 are arranged, so as to face the end surfaces of twelve optical transmission members 150, respectively. It is preferable that the central axes (optical axes) of second optical surfaces 132 be orthogonal to the end surfaces of optical transmission members 150. It is also preferable that the central axes (optical axes) of second optical surfaces 132 coincide respectively with the optical axes of rays of the reception light emitted from optical transmission members 150 and with the optical axes of rays of the transmission light entering optical transmission members 150. Note that, when photoelectric conversion elements 112 and optical transmission members 150 are arranged in two or more rows, the number of rows of arranged second optical surfaces 132 is identical to those of photoelectric conversion elements 112 and optical transmission members 150.

In the present embodiment, six of twelve second optical surfaces 132 on the right side in FIG. 2C are used as second optical surfaces 132 for transmission, and six of twelve second optical surfaces 132 on the left side are used as second optical surfaces 132 for reception. The transmission light having passed through the inside of optical-receptacle main body 130 is emitted from second optical surfaces 132 for transmission, and the reception light from optical transmission members 150 is incident on second optical surfaces 132 for reception to enter the inside of optical-receptacle main body 130.

Reflective surface 133 reflects, toward second optical surfaces 132, the transmission light incident on first optical surfaces 131 and having entered the inside of optical-receptacle main body 130. Reflective surface 133 also reflects, toward first optical surfaces 131, the reception light incident on second optical surfaces 132 and having entered the inside of optical-receptacle main body 130. Reflective surface 133 is a part of the inner surface of first recess 1301 formed in the top surface of optical-receptacle main body 130. Reflective surface 133 is disposed between second contacting surface 135 and a surface on which second optical surfaces 132 are disposed (that surface is the front surface of optical-receptacle main body 130).

In the present embodiment, reflective surface 133 is inclined such that a distance from reflective surface 133 to second optical surfaces 132 (or optical transmission members 150) increases with increasing distance from the top surface to the bottom surface of optical-receptacle main body 130. The inclination angle of reflective surface 133 is 45 degrees with respect to the optical axes of first optical surfaces 131 and with respect to the optical axes of second optical surfaces 132.

First contacting surface 134 is a part of the top surface of optical-receptacle main body 130. First contacting surface 134 is in contact with the inner surface of supporting member 140. First contacting surface 134 is disposed opposite a surface on which first optical surfaces 131 are disposed (that surface is the bottom surface of optical-receptacle main body 130).

Second contacting surface 135 is a side surface of second recess 1302. Second contacting surface 135 is also in contact with the inner surface of supporting member 140. Second contacting surface 135 is in contact with a side surface of protrusion 1411 (see FIG. 3A) formed on the inner surface of supporting member 140 in the present embodiment. Second contacting surface 135 is disposed opposite the surface on which second optical surfaces 132 are disposed (front surface of optical-receptacle main body 130). Second contacting surface 135 is disposed along the direction orthogonal to the direction in which the end surfaces of optical transmission members 150 and second optical surfaces 132 face each other. In the present embodiment, second contacting surface 135 is parallel to the surface on which second optical surfaces 132 are disposed, and is orthogonal to the optical axes (central axes) of second optical surfaces 132.

Third contacting surface 136 is the bottom surface of second recess 1302. Third contacting surface 136 is disposed opposite the surface on which first optical surfaces 131 are disposed (bottom surface of optical-receptacle main body 130). The distance between third contacting surface 136 and the bottom surface of optical-receptacle main body 130 is smaller than the distance between first contacting surface 134 and the bottom surface of optical-receptacle main body 130. Third contacting surface 136 is also in contact with the inner surface of supporting member 140. Third contacting surface 136 is in contact with the top face of protrusion 1411 formed on the inner surface of supporting member 140. Third contacting surface 136 may or may not be parallel to first contacting surface 134. Third contacting surface 136 is parallel to first contacting surface 134 in the present embodiment.

Figure 3A:
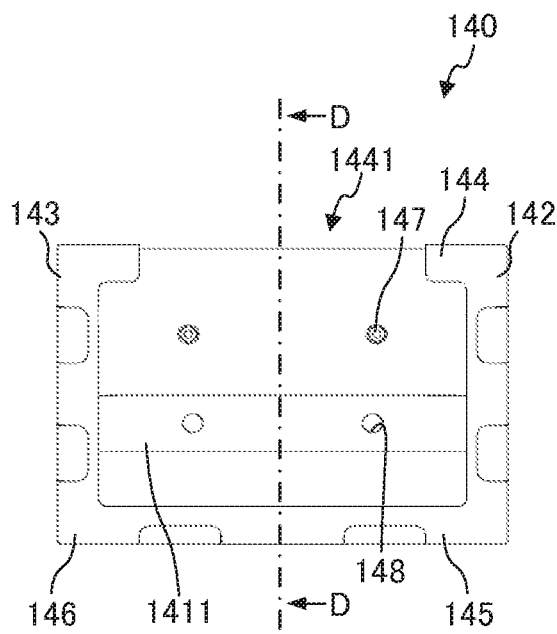
FIGS. 3A to 3D illustrate a configuration of a supporting member according to Embodiment 1.

First fitting portions 137 are disposed in first contacting surface 134 of optical-receptacle main body 130, and are fitted to second fitting portions 147 of supporting member 140 (see FIG. 3A). First fitting portions 137 and second fitting portions 147 are fitted to each other, so that the position of optical-receptacle main body 130 supported by supporting member 140 may be determined.

The positions, shape, size, and number of first fitting portions 137 are not limited specifically as long as the above-described function can be ensured, and the positions, shape, size, and number of first fitting portions 137 correspond respectively to the positions, shape, size, and number of second fitting portions 147 of supporting member 140. Two first fitting portions 137 are provided in the present embodiment. Two first fitting portions 137 are disposed at the opposite sides of first recess 1301 along the direction in which the right side surface and the left side surface of optical-receptacle main body 130 face each other. Examples of the shape of each of first fitting portions 137 include a cylindrical shape, prismatic shape, and through-hole shape. First contacting portions 137 are cylindrical recesses in the present embodiment.

Adhesion through holes 138 are open in third contacting surface 136 and the surface located opposite third contacting surface 136 (bottom surface of optical-receptacle main body 130). Adhesive 10 is disposed inside adhesion through holes 138. Optical-receptacle main body 130 and supporting member 140 are adhered to each other via adhesive 10.

The positions, shape, size, and number of adhesion through holes 138 are not limited specifically as long as adhesive 10 can be disposed inside adhesion through holes 138. The positions and number of adhesion through holes 138 correspond respectively to the positions and number of adhesion recesses 148 described below. Two adhesion through holes 138 are provided in the present embodiment. Two adhesion through holes 138 are disposed at the opposite ends of third contacting surface 136 along the direction in which the right side surface and the left side surface of optical-receptacle main body 130 face each other. Examples of the shape of each of adhesion through holes 138 include a cylindrical shape and prismatic shape. Adhesion through holes 138 have a cylindrical shape in the present embodiment. The size of each of adhesion through holes 138 may or may not be constant over its extension from the surface located opposite third contacting surface 136 to third contacting surface 136 (see below-mentioned Modification 3 for adhesion through holes 138 of an inconstant size). The size of each of adhesion through holes 138 is constant over its extension from the surface located opposite third contacting surface 136 to third contacting surface 136 in the present embodiment.

Ferrule protrusions 139 are fitted in fitting portions formed in a ferrule for holding optical transmission members 150, for example. The relative position of optical transmission members 150 to optical-receptacle main body 130 in the in-plane direction of the front surface of optical-receptacle main body 130 may thus be determined. The positions, shape, size, and number of ferrule protrusions 139 are not limited specifically as long as the above-described function can be ensured, and the positions, shape, size, and number of ferrule protrusions 139 correspond respectively to the positions, shape, size, and number of the fitting portions of the ferrule. Two ferrule protrusions 139 are provided in the present embodiment. Two ferrule protrusions 139 are disposed on the front surface of optical-receptacle main body 130. Ferrule protrusions 139 are disposed at the opposite sides of a row of second optical surfaces 132 along the arrangement direction in which second optical surfaces 132 are disposed in the present embodiment. Ferrule protrusions 139 have a cylindrical shape having a hemispherical front end.

Figure 3B:
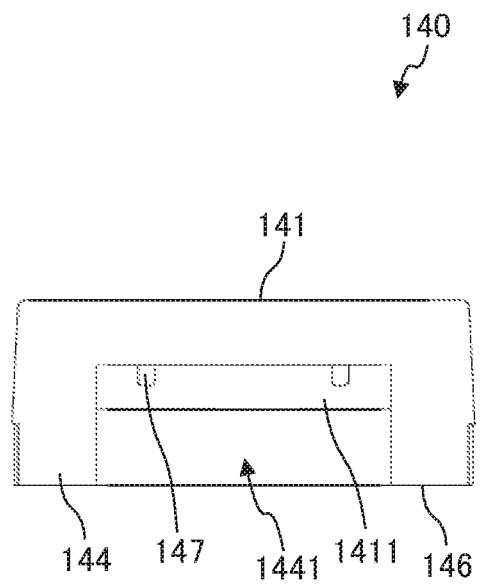
Figure 3C:
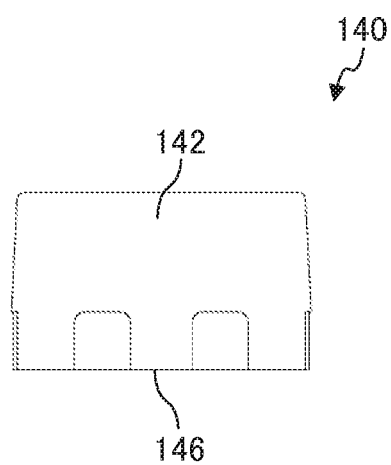
Figure 3D:
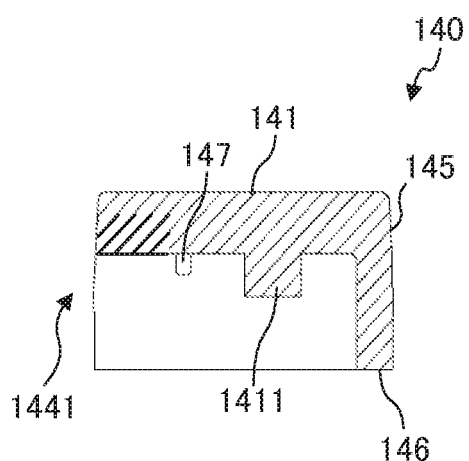

FIGS. 3A to 3D illustrate a configuration of supporting member 140. FIG. 3A is a bottom view of supporting member 140, FIG. 3B is a front view of supporting member 140, FIG. 3C is a right side view of supporting member 140, and FIG. 3D is a sectional view of supporting member 140 taken along line D-D in FIG. 3A. Note that, hereinafter, descriptions will be given in which a surface of supporting member 140 facing the same direction in which the front surface of optical-receptacle main body 130 faces is regarded as the front surface of supporting member 140.

As illustrated in FIG. 1, supporting member 140 supports optical-receptacle main body 130, with substrate 111 and optical-receptacle main body 130 being spaced apart from each other. Supporting member 140 is in contact with first contacting surface 134, second contacting surface 135, and third contacting surface 136 of optical-receptacle main body 130. The shape and the size of supporting member 140 are not limited specifically as long as supporting member 140 does not hinder the travel of light passing through an optical path between photoelectric conversion elements 112 and optical transmission members 150 and as long as supporting member 140 can support optical-receptacle main body 130 while being in contact with first contacting surface 134, second contacting surface 135, and third contacting surface 136 of optical-receptacle main body 130. Supporting member 140 supports optical-receptacle main body 130 in a recess formed in the bottom surface of supporting member 140 (this bottom surface is a surface of supporting member 140 facing substrate 111) in the present embodiment. The shape of the bottom surface of the recess formed in supporting member 140 (that bottom surface is the top surface of an interior space) corresponds to the shape of the top surface of optical-receptacle main body 130.

Supporting member 140 is composed of top plate 141, right side plate 142, left side plate 143, front plate 144, and rear plate 145 in the present embodiment. Members constituting supporting member 140 may be integrally formed, or may also be formed as separate members. The members constituting supporting member 140 are integrally formed in the present embodiment.

Top plate 141 is disposed in a region covering one of openings defined by right side plate 142, left side plate 143, front plate 144, and rear plate 145. One surface of top plate 141 (inner surface of supporting member 140) is in contact with a part of the top surface of optical-receptacle main body 130. The shape of the one surface of top plate 141 is not limited specifically as long as top plate 141 can come into contact with the top surface of optical-receptacle main body 130. The shape of the one surface of top plate 141 corresponds to the shape of the top surface of optical-receptacle main body 130. Protrusion 1411 is formed on the one surface of top plate 141 in the present embodiment. A surface of protrusion 1411 disposed on the side of the front surface of optical-receptacle main body 130 is in contact with the side surface (second contacting surface 135) of second recess 1302 of optical-receptacle main body 130. A surface of protrusion 1411 on the side of the bottom surface of optical-receptacle main body 130 is in contact with the bottom surface of second recess 1302 (third contacting surface 136) of optical-receptacle main body 130. Supporting member 140 can thus support optical-receptacle main body 130, with the top surface of optical-receptacle main body 130 and the inner surface of supporting member 140 being in contact with each other.

One surface of right side plate 142 (inner surface of supporting member 140) faces the right side surface of optical-receptacle main body 130. This one surface of right side plate 142 and the right side surface of optical-receptacle main body 130 may be in contact with each other, or may be spaced apart from each other. This one surface of right side plate 142 and the right side surface of optical-receptacle main body 130 paired with each other are spaced apart from each other in the present embodiment.

One surface of left side plate 143 (inner surface of supporting member 140) faces the left side surface of optical-receptacle main body 130. This one surface of left side plate 143 and the left side surface of optical-receptacle main body 130 may be in contact with each other, or may be spaced apart from each other. This one surface of left side plate 143 and the left side surface of optical-receptacle main body 130 paired with each other are spaced apart from each other in the present embodiment.

Opening 1441 is formed in front plate 144. Optical transmission member 150 may thus be connected to optical-receptacle main body 130 from the side of front plate 144.

One surface of rear plate 145 (inner surface of supporting member 140) faces a part of the rear surface of optical-receptacle main body 130. This one surface of rear plate 145 and the rear surface of optical-receptacle main body 130 may be in contact with each other, or may be spaced apart from each other. This one surface of rear plate 145 and the rear surface of optical-receptacle main body 130 are spaced apart from each other in the present embodiment.

Supporting member 140 includes installation surface 146, second fitting portions 147, and adhesion recesses 148.

Installation surface 146 is a surface of supporting member 140 for installation on substrate 111. Installation surface 146 is the lower surfaces (bottom surfaces) of right side plate 142, left side plate 143, front plate 144, and rear plate 145. The lengths of right side plate 142, left side plate 143, front plate 144, and rear plate 145 in their height direction are the same as one another. The lengths of right side plate 142, left side plate 143, front plate 144, and rear plate 145 in their height direction are greater than the height of optical-receptacle main body 130. When supporting member 140 is disposed on substrate 111, optical-receptacle main body 130 may thus be supported by supporting member 140 to be spaced apart from the surface of substrate 111 (imaginary plane including installation surface 146). In other words, a space is formed between optical-receptacle main body 130 and substrate 111 in optical module 100.

Second fitting portions 147 are disposed on a surface of supporting member 140 facing first contacting surface 134. Second fitting portions 147 are fitted in first fitting portions 137 of optical-receptacle main body 130. First fitting portions 137 and second fitting portions 147 are fitted to each other, so that the position of optical-receptacle main body 130 supported by supporting member 140 may be determined.

The positions, shape, size, and number of second fitting portions 147 are not limited specifically as long as the above-described function can be ensured, and the positions, shape, size, and number of second fitting portions 147 correspond respectively to the positions, shape, size, and number of first fitting portions 137 of optical-receptacle main body 130. Two second fitting portions 147 are provided in the present embodiment. Two second fitting portions 147 are disposed along the direction in which right side plate 142 and left side plate 143 face each other. Examples of the shape of each of second fitting portions 147 include a cylindrical shape, prismatic shape, and through-hole shape. Second fitting portions 147 are cylindrical protrusions in the present embodiment.

Adhesion recesses 148 are open in a surface of supporting member 140 facing third contacting surface 136, and communicate with adhesion through holes 138. Adhesion recesses 148 are open in the top surface of protrusion 1411 formed on top plate 141. Adhesive 10 is disposed inside adhesion recesses 148. As described above, optical-receptacle main body 130 and supporting member 140 are adhered to each other via adhesive 10.

The positions, shape, size, and number of adhesion through recesses 148 are not limited specifically as long as the insides of adhesion through recesses 148 can be filled with the adhesive via adhesion through holes 138 and the adhesive can be cured. The positions and number of adhesion recesses 148 correspond respectively to the positions and number of adhesion through holes 138. In the present embodiment, two adhesion recesses 148 are provided, and are disposed along the direction in which two of right side plate 142 and left side plate 143 face each other. Examples of the shape of each of adhesion recesses 148 include a cylindrical shape and prismatic shape. Adhesion recesses 148 have a cylindrical shape in the present embodiment. The size of each of adhesion recesses 148 may or may not be constant over its extension from the bottom surface of adhesion recess 148 to the opening of adhesion recess 148. The size of each of adhesion recesses 148 is constant over its extension from the bottom surface of adhesion recess 148 to the opening of adhesion recess 148 in the present embodiment.

Additionally, the size of the opening of each of adhesion through holes 138 on the side of third contacting surface 136 may be the same as or may be different (see below-mentioned Modifications 1 and 2) from the size of the opening of each of adhesion recesses 148. The size of the opening of each of adhesion through holes 138 on the side of third contacting surface 136 is the same as the size of the opening of each of adhesion recesses 148 in the present embodiment. "Size of the opening" as used herein means the opening length of the through hole or recess in any direction passing through the center of the opening plane (center of gravity) in the opening plane of the through hole or recess. For example, when the shape of the opening end surface of the through hole or recess is circular, the size of the opening of the through hole or recess is the diameter of the opening end surface.

Supporting member 140 may be formed of an optically-transparent or optically-untransparent material. Examples of the material of supporting member 140 include polycarbonate (PC), polyether imide (PEI), and polyether sulfone (PES).

(Method for Producing Optical Module)

A method for producing optical module 100 is not limited specifically. For example, optical module 100 may be produced by a below-described production method.

The method for producing of optical module 100 includes a first process step of fixing optical-receptacle main body 130 and supporting member 140 to each other, and a second process step of fixing supporting member 140 to which optical-receptacle main body 130 is fixed and substrate 111 to each other.

1) First Process Step

Optical-receptacle main body 130 and supporting member 140 are fixed to each other in the first process step. To begin with, optical-receptacle main body 130 and supporting member 140 are prepared. Optical-receptacle main body 130 and supporting member 140 may be produced by injection molding, for example.

Prepared optical-receptacle main body 130 is then disposed at a predetermined position in prepared supporting member 140 and is fixed there. More specifically, optical-receptacle main body 130 is brought into contact with supporting member 140 at first contacting surface 134, second contacting surface 135, and third contacting surface 136, and first fitting portions 137 of optical-receptacle main body 130 are fitted to second fitting portions 147 of supporting member 140. Thus, optical-receptacle main body 130 is positioned, and optical-receptacle main body 130 and supporting member 140 are coupled together such that adhesion through holes 138 of optical-receptacle main body 130 and adhesion recesses 148 of supporting member 140 communicate with each other. Optical-receptacle main body 130 is disposed at a predetermined position from the side of the bottom surface of supporting member 140, with the top surface of optical-receptacle main body 130 and the top surface of supporting member 140 turned downward in the present embodiment.

An adhesive is injected inside adhesion through holes 138 and adhesion recesses 148 and is cured, with optical-receptacle main body 130 being in contact with supporting member 140 at first contacting surface 134, second contacting surface 135, and third contacting surface 136. Optical-receptacle main body 130 and supporting member 140 may thus be adhered to each other via adhesive 10 disposed inside adhesion through holes 138 and adhesion recesses 148. With the top surface of optical-receptacle main body 130 and the top surface of supporting member 140 turned downward, the adhesive is injected inside adhesion through holes 138 and adhesion recesses 148 from the side of the bottom surface of optical-receptacle main body 130 in the present embodiment.

As described above, reflective surface 133 is disposed between the surface on which second optical surfaces 132 are disposed (front surface of optical-receptacle main body 130) and second contacting surface 135, and the wall is disposed between first recess 1301 and second recess 1302. Accordingly, when the adhesive is injected from the side of adhesion through holes 138, the adhesive never reaches reflective surface 133 even when the adhesive flows in between third contacting surface 136 of optical-receptacle main body 130 and the surface of supporting member 140 facing third contacting surface 136. It is thus possible to reduce a decrease in optical property of optical receptacle 120 due to the adhesive applied to an optical surface (reflective surface 133) in the present embodiment.

2) Second Process Step

In the second process step, supporting member 140 to which optical-receptacle main body 130 is fixed (optical receptacle 120) and substrate 111 are fixed to each other, such that substrate 111 and optical-receptacle main body 130 are spaced apart from each other. To begin with, photoelectric conversion device 110 including photoelectric conversion elements 112 (light-emitting elements and light-receiving elements) mounted on substrate 111 is prepared. For example, photoelectric conversion device 110 as a commercial product may be purchased. Subsequently, optical receptacle 120 is disposed on photoelectric conversion device 110 and fixed thereto. More specifically, first optical surfaces 131 of optical-receptacle main body 130 and the photoelectric conversion surfaces of photoelectric conversion elements 112 are aligned to face each other, and supporting member 140 of optical receptacle 120 and substrate 111 of photoelectric conversion device 110 are fixed to each other. Optical receptacle 120 is thus fixed to substrate 111 such that optical-receptacle main body 130 is spaced apart from substrate 111.

The method of fixing substrate 111 and supporting member 140 to each other is not limited specifically. For example, substrate 111 and supporting member 140 may be fixed to each other by adhesion with an adhesive. A position at which substrate 111 and supporting member 140 are adhered to each other is not limited specifically as long as substrate 111 and supporting member 140 do not hinder the travel of light passing through the optical path between photoelectric conversion elements 112 and optical transmission members 150. For example, the surface of substrate 111 and the outer surfaces of right side plate 142 and left side plate 143 of supporting member 140 are adhered to each other.

Optical module 100 according to the present embodiment can be produced using the method described above.

(Effect)

As described above, in optical receptacle 120 according to the present embodiment, optical-receptacle main body 130 is adhered, via adhesive 10 disposed inside adhesion through holes 138 and adhesion recesses 148, to supporting member 140 to be spaced apart from the imaginary plane including installation surface 146. Optical-receptacle main body 130 thus is not in contact with substrate 111 in optical module 100 according to the present embodiment, so that a space may be formed between substrate 111 and optical-receptacle main body 130. Consequently, it is possible to secure the region for wire bonding and the region for other optical components, electronic components, and/or the like to be disposed, so as to increase the design flexibility of the optical module. For example, a larger IC can be disposed on substrate 111. It is also possible to reduce generation of electromagnetic interference by installing an IC near the photoelectric conversion elements 112.

Additionally or alternatively, in optical receptacle 120 according to the present embodiment, second contacting surface 135 is disposed opposite the surface on which second optical surfaces 132 are disposed (front surface of optical receptacle 120), and is in contact with supporting member 140. Additionally or alternatively, second contacting surface 135 is disposed along the direction orthogonal to the direction in which the end surfaces of optical transmission members 150 face the surface on which second optical surfaces 132 are disposed (the direction in which the ferrule is attached or detached). Accordingly, the stress caused during attachment and detachment of optical transmission members 150 in which optical transmission members 150 are inserted in or removed from the ferrule is applied to supporting member 140 with which optical-receptacle main body 130 is in contact at second contacting surface 135 of optical-receptacle main body 130, but such a stress is not directly applied to optical-receptacle main body 130. Further, stresses in a tensile direction of optical transmission members 150 and in a direction in which optical transmission members 150 are pressed against the ferrule are not applied directly to optical-receptacle main body 130 not only during attachment and detachment of optical transmission members 150, but also during use of optical module 100. Consequently, since the aforementioned stresses are not applied to portions at which optical-receptacle main body 130 and supporting member 140 are adhered to each other, it is possible to prevent the position of optical-receptacle main body 130 from shifting and to prevent optical-receptacle main body 130 from coming off supporting member 140 during attachment and detachment of optical transmission members 150 or during use of optical module 100.

Additionally, in optical receptacle 120 according to the present embodiment, optical-receptacle main body 130 is adhered to supporting member 140 via adhesive 10 disposed inside adhesion through holes 138 and adhesion recesses 148. In contrast, in a case where adhesive 10 is disposed on fitted portions, that is, in a case where optical-receptacle main body 130 and supporting member 140 are adhered to each other by applying an adhesive to one or both of first fitting portions 137 and second fitting portions 147 and by curing the adhesive, shrinkage of the adhesive may cause the position of optical-receptacle main body 130 to be shifted from a designed position. Contrariwise, in the present embodiment, optical-receptacle main body 130 is adhered to supporting member 140 at a position different from the fitted portions in which first fitting portions 137 of optical-receptacle main body 130 and second fitting portions 147 of supporting member 140 are fitted to each other. It is thus possible to adhere optical-receptacle main body 130 and supporting member 140 to each other with high accuracy, so as to prevent the position shift of optical-receptacle main body 130 caused by the adhesive.

Moreover, in the case where optical-receptacle main body 130 is adhered to supporting member 140 at the fitted portions (first fitting portions 137 and second fitting portions 147), there is a risk that the adhesive flows onto the optical surface of optical-receptacle main body 130 (e.g., reflective surface 133), so as to cause a decrease in optical property of optical-receptacle main body 130. Contrariwise, in the present embodiment, optical-receptacle main body 130 is in contact with supporting member 140 at second contacting surface 135 disposed between the fitted portions of optical-receptacle main body 130 and supporting member 140, on the one hand, and the portions at which optical-receptacle main body 130 and supporting member 140 are adhered to each other, on the other hand. Thus, the adhesive never reaches the optical surface through a gap between optical-receptacle main body 130 and supporting member 140 when optical-receptacle main body 130 and supporting member 140 are adhered to each other. It is thus possible to reduce a decrease in optical property of optical-receptacle main body 130 caused by the adhesive being applied to the optical surface.

Further, optical-receptacle main body 130 and supporting member 140 can be easily adhered to each other in the present embodiment by injecting the adhesive inside adhesion through holes 138 and adhesion recesses 148 and by curing the adhesive. Consequently, optical receptacle 120 and optical module 100 according to the present embodiment may be produced easily.

[Modification]

The aforementioned embodiment has been described in relation to the case where both of adhesion through holes 138 and adhesion recesses 148 have the cylindrical shapes and the openings of adhesion through holes 138 on the side of third contacting surface 136 and the openings of adhesion recesses 148 have the same size as each other. However, the shape and size of adhesion through holes 138 and the shape and size of adhesion recesses 148 may be any shape and size as long as adhesive 10 can be disposed inside adhesion through holes 138 and adhesion recesses 148, and the shapes and sizes of adhesion through holes 138 and of adhesion recesses 148 are not limited to the presented aspect.

Figure 4A:
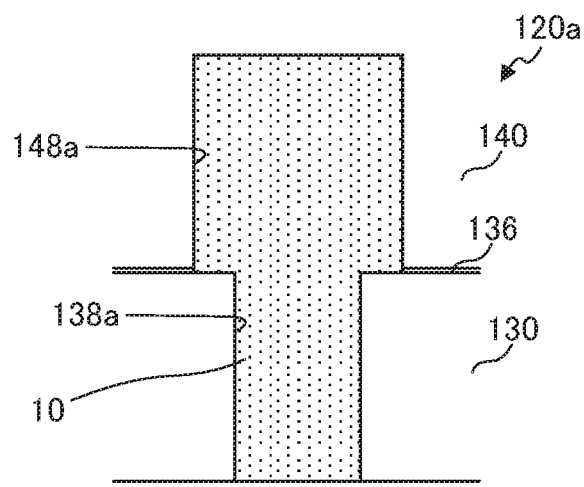
FIGS. 4A to 4C are partially enlarged sectional views illustrating configurations of optical receptacles according to Modifications 1 to 3.
Figure 4B:
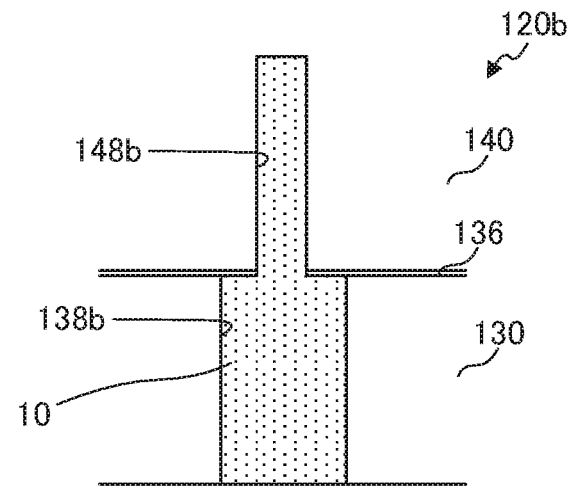
Figure 4C:
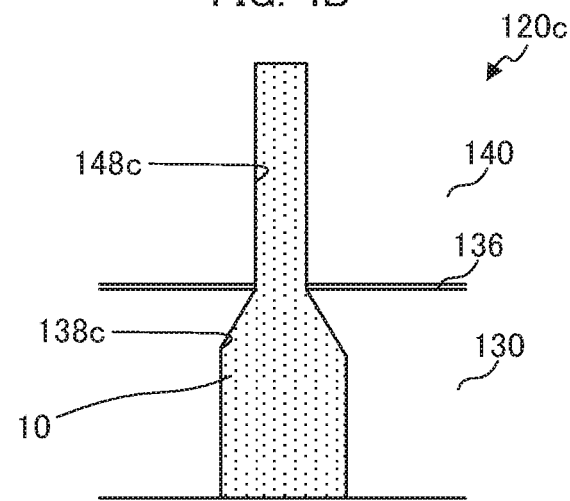

FIGS. 4A to 4C are partially enlarged sectional views illustrating configurations of optical receptacles 120a to 120c according to Modifications 1 to 3. FIGS. 4A to 4C are partially enlarged sectional views of the region boxed with the dashed dotted line in FIG. 1. FIG. 4A is a partially enlarged sectional view illustrating the configuration of optical receptacle 120a according to Modification 1, FIG. 4B is a partially enlarged sectional view illustrating the configuration of optical receptacle 120b according to Modification 2, and FIG. 4C is a partially enlarged sectional view illustrating the configuration of optical receptacle 120c according to Modification 3.

As illustrated in FIG. 4A, the size of the openings of adhesion through holes 138a on the side of third contacting surface 136 may be smaller than the size of the openings of adhesion recesses 148a. Thus, the contact area between optical-receptacle main body 130 and adhesive 10 becomes greater than in the case where the size of the aforementioned openings of adhesion through holes 138 and the size of the openings of adhesion recesses 148 are the same as each other. Consequently, optical-receptacle main body 130 can be adhered to supporting member 140 more firmly.

Meanwhile, as illustrated in FIG. 4B, the size of the openings of adhesion through holes 138b on the side of third contacting surface 136 may be greater than the size of the openings of adhesion recesses 148b. Thus, the contact area between supporting member 140 and adhesive 10 becomes greater than in the case where the size of the aforementioned openings of adhesion through holes 138 and the size of the openings of adhesion recesses 148 are the same as each other. Consequently, optical-receptacle main body 130 can be adhered to supporting member 140 more firmly.

Additionally or alternatively, as illustrated in FIG. 4C, a portion of each of adhesion through holes 138c including the opening of adhesion through hole 138c on the side of third contacting surface 136 may have a tapered shape in which the size of adhesion through hole 138c becomes smaller toward third contacting surface 136 from the surface located opposite third contacting surface 136. The tapered shape may be formed over an entire portion between third contacting surface 136 and the surface located opposite third contacting surface 136, or may be formed in a partial portion between third contacting surface 136 and the surface located opposite third contacting surface 136. The tapered shape is formed in a partial portion between third contacting surface 136 and the surface located opposite third contacting surface 136 in Modification 3. Additionally or alternatively, in optical receptacle 120c according to Modification 3, the size of the openings of adhesion recesses 148c may be equal to or smaller than the size of the openings of adhesion through holes 138c on the side of third contacting surface 136. The size of the openings of adhesion recesses 148c is equal to the size of the aforementioned openings of adhesion through holes 138c in Modification 3. Thus, in the process step of adhering optical-receptacle main body 130 to supporting member 140, it becomes less likely for the adhesive to flow in between optical-receptacle main body 130 and supporting member 140 when the adhesive is injected inside adhesion through holes 138c and adhesion recesses 148c. Consequently, optical-receptacle main body 130 and supporting member 140 can be assembled with high accuracy.

Embodiment 2

An optical receptacle and an optical module according to Embodiment 2 are different from optical receptacle 120 and optical module 100 according to Embodiment 1, respectively, only in the shapes of optical-receptacle main body 230 and supporting member 240. Accordingly, the same components as those of optical receptacle 120 and optical module 100 according to Embodiment 1 are provided with the same reference signs and descriptions of such components are omitted.

The optical module according to Embodiment 2 includes photoelectric conversion device 110 and the optical receptacle according to Embodiment 2. The optical receptacle according to Embodiment 2 includes optical-receptacle main body 230 and supporting member 240.

Figure 5A:
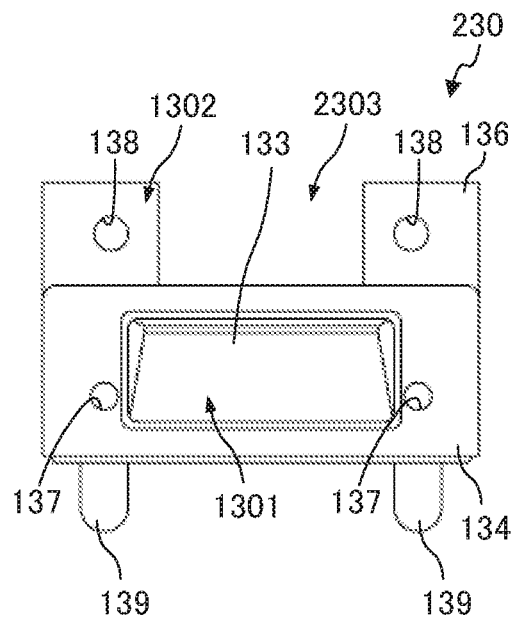
FIGS. 5A to 5D illustrate a configuration of an optical-receptacle main body according to Embodiment 2.
Figure 5B:
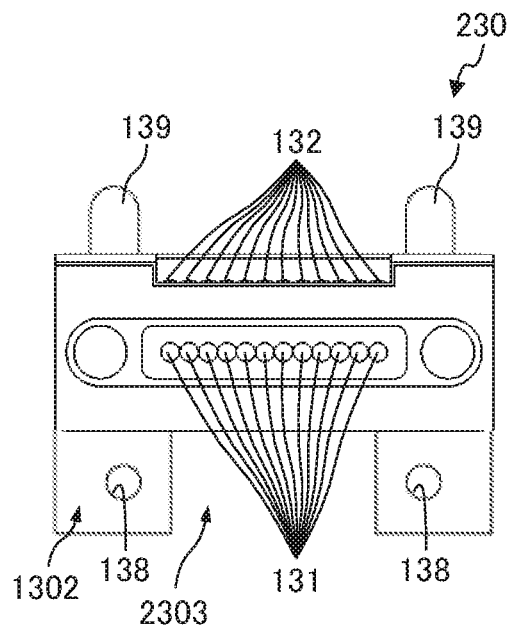
Figure 5C:
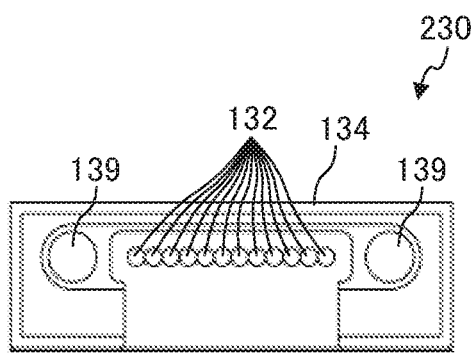
Figure 5D:
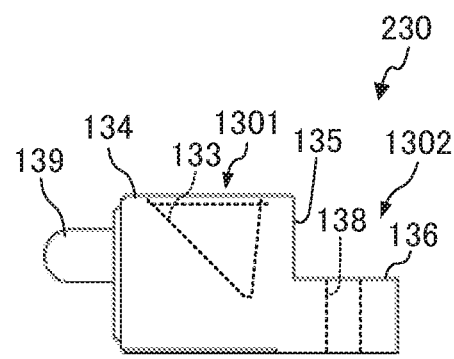

FIGS. 5A to 5D illustrate the configuration of optical-receptacle main body 230. FIG. 5A is a plan view of optical-receptacle main body 230, FIG. 5B is a bottom view of optical-receptacle main body 230, FIG. 5C is a front view of optical-receptacle main body 230, and FIG. 5D is a right side view of optical-receptacle main body 230.

As illustrated in FIGS. 5A to 5D, optical-receptacle main body 230 is a member having a substantially rectangular parallelepiped shape. First recess 1301, second recess 1302, and cutout 2303 are formed in the top surface of optical-receptacle main body 230 in the present embodiment. Cutout 2303 is formed in a central portion of a portion of optical-receptacle main body 230 disposed closer to the bottom surface of optical-receptacle main body 230 than second recess 1302 is.

Optical-receptacle main body 230 is optically transparent. Optical-receptacle main body 230 allows the transmission light emitted by the light-emitting elements to be emitted toward the end surfaces of optical transmission members 150 and also allows the reception light emitted from the end surfaces of optical transmission members 150 to be emitted toward the light-receiving elements. Optical-receptacle main body 230 is formed using a material optically transparent to the light of wavelengths used for optical communications (transmission light and reception light). Examples of the material of optical-receptacle main body 230 include polyetherimide (PEI) and cyclic olefin resin.

Optical-receptacle main body 230 includes twelve first optical surfaces 131, twelve second optical surfaces 132, reflective surface 133, first contacting surface 134, second contacting surface 135, two third contacting surfaces 136, two first fitting portions 137, two adhesion through holes 138, and two ferrule protrusions 139.

Optical-receptacle main body 230 is adhered, via adhesive 10 disposed inside adhesion through holes 138 and adhesion recesses 148, to supporting member 240 to be in contact with supporting member 240 at first contacting surface 134, second contacting surface 135, and two third contacting surfaces 136 and to be spaced apart from an imaginary plane (surface of substrate 111) including installation surface 146 of supporting member 240.

Figure 6A:
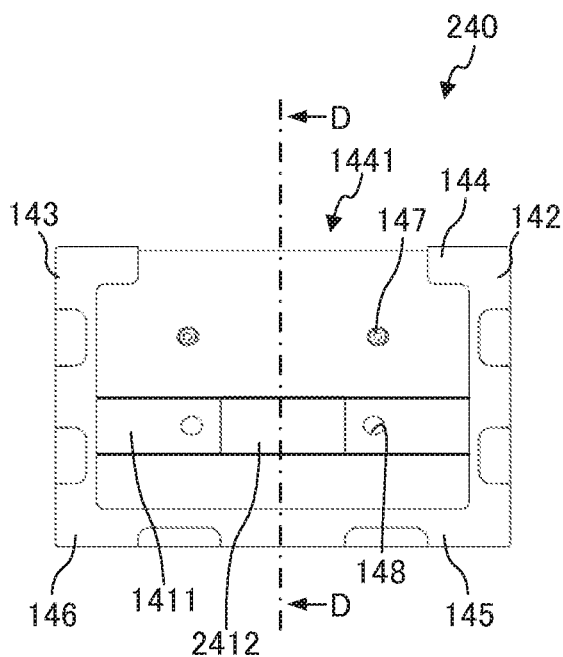
FIGS. 6A to 6D illustrate a configuration of a supporting member according to Embodiment 2.
Figure 6B:
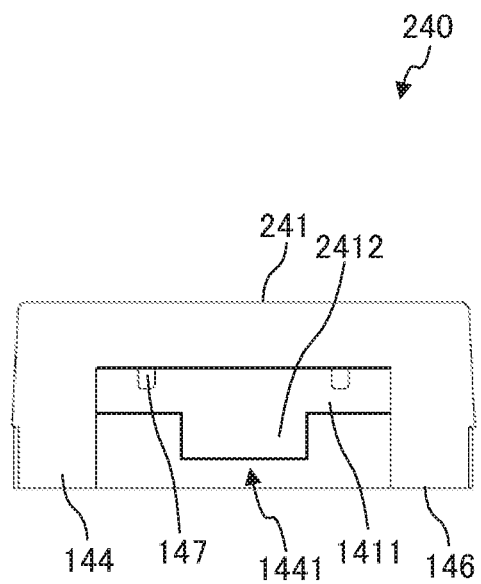
Figure 6C:
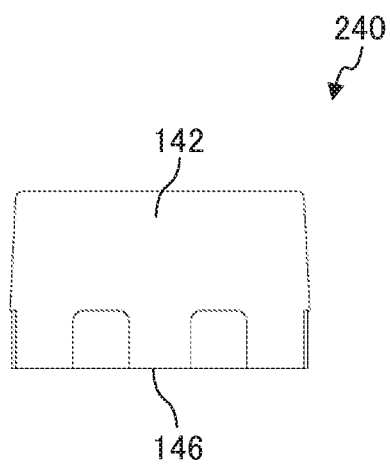
Figure 6D:
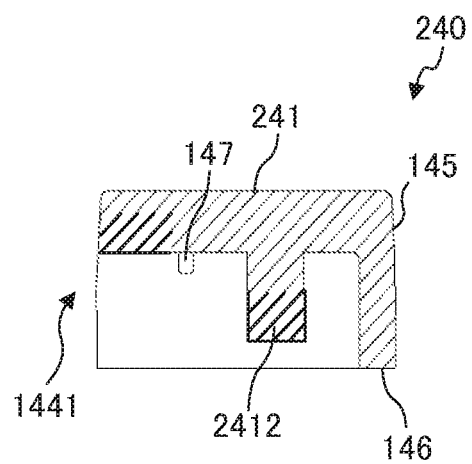

FIGS. 6A to 6D illustrate a configuration of supporting member 240. FIG. 6A is a bottom view of supporting member 240, FIG. 6B is a front view of supporting member 240, FIG. 6C is a right side view of supporting member 240, and FIG. 6D is a sectional view of supporting member 240 taken along line D-D in FIG. 6A.

Supporting member 240 supports optical-receptacle main body 230, with substrate 111 and optical-receptacle main body 230 being spaced apart from each other. Supporting member 240 is in contact with first contacting surface 134, second contacting surface 135, and two third contacting surfaces 136 of optical-receptacle main body 230. The shape and the size of supporting member 240 are not limited specifically as long as supporting member 240 does not hinder the travel of light passing through the optical path between photoelectric conversion elements 112 and optical transmission members 150 and as long as supporting member 240 can support optical-receptacle main body 230 while being in contact with first contacting surface 134, second contacting surface 135, and two third contacting surfaces 136 of optical-receptacle main body 230. Supporting member 240 supports optical-receptacle main body 230 in a recess formed in the bottom surface of supporting member 240 (the bottom surface is the surface facing substrate 111) in the present embodiment. The shape of the bottom surface of the recess formed in supporting member 240 corresponds to the shape of the top surface of optical-receptacle main body 230.

Supporting member 240 is composed of top plate 241, right side plate 142, left side plate 143, front plate 144, and rear plate 145 in the present embodiment. Members constituting supporting member 240 may be integrally formed, or may also be formed as separate members. The members constituting supporting member 240 are integrally formed in the present embodiment.

Top plate 241 is disposed in the region covering one of openings defined by right side plate 142, left side plate 143, front plate 144, and rear plate 145. One surface of top plate 241 (inner surface of supporting member 240) is in contact with a part of the top surface of optical-receptacle main body 230. The shape of the one surface of top plate 241 is not limited specifically as long as top plate 241 can come into contact with the top surface of optical-receptacle main body 230. The shape of the one surface of top plate 241 corresponds to the shape of the top surface of optical-receptacle main body 230. First protrusion 1411 and second protrusion 2412 are formed on the one surface of top plate 241 in the present embodiment. Second protrusion 2412 is formed at a central portion of first protrusion 1411 on the side of the bottom surface of optical-receptacle main body 230. The surfaces of first protrusion 1411 and second protrusion 2412 on the side of the front surface of optical-receptacle main body 230 are in contact with the inner surface of second recess 1302 of optical-receptacle main body 230 (the inner surface is second contacting surface 135) in the present embodiment.

(Effect)

As described above, the optical receptacle and the optical module according to Embodiment 2 also have the same effects as Embodiment 1. Cutout 2303 is formed in optical-receptacle main body 230 of the optical receptacle according to Embodiment 2. Thus, the region for wire bonding and the region for other optical components, electronic components, and/or the like to be disposed can be secured more than in optical receptacle 120 according to Embodiment 1, so that the design flexibility of the optical module can be increased further. Moreover, second contacting surface 135 of optical-receptacle main body 230 is in contact with the surfaces of first protrusion 1411 and second protrusion 2412. The stresses caused during attachment or detachment of the optical transmission members or during use of the optical module can thus be exerted on supporting member 240 more surely than in optical receptacle 120 according to Embodiment 1. Consequently, it is possible to further prevent the position of optical-receptacle main body 230 from shifting and optical-receptacle main body 230 from coming off supporting member 240 during attachment and detachment of optical transmission members 150.

Embodiment 3

Optical receptacle 320 and optical module 300 according to Embodiment 3 are different from optical receptacle 120 and optical module 100 according to Embodiment 1, respectively, only in that third contacting surface 336 of optical-receptacle main body 330 and the surface of supporting member 340 in contact with third contacting surface 336 are inclined. Accordingly, the same components as those of optical receptacle 120 and optical module 100 according to Embodiment 1 are provided with the same reference signs and descriptions of such components are omitted.

Figure 7:
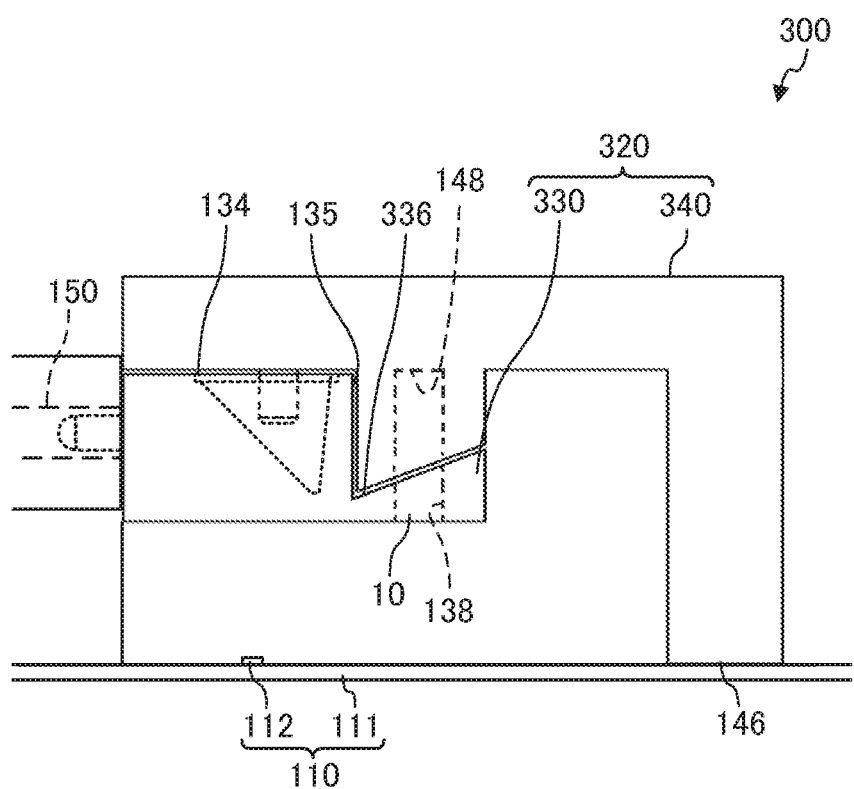
FIG. 7 is a schematic side view illustrating a configuration of an optical module according to Embodiment 3.

FIG. 7 is a schematic side view illustrating a configuration of optical module 300 according to Embodiment 3. More specifically, FIG. 7 is a right side view of optical module 300 as seen from the inside of supporting member 340. As illustrated in FIG. 7, optical module 300 according to Embodiment 3 includes photoelectric conversion device 110 and optical receptacle 320. Optical receptacle 320 includes optical-receptacle main body 330 and supporting member 340.

Figure 8A:
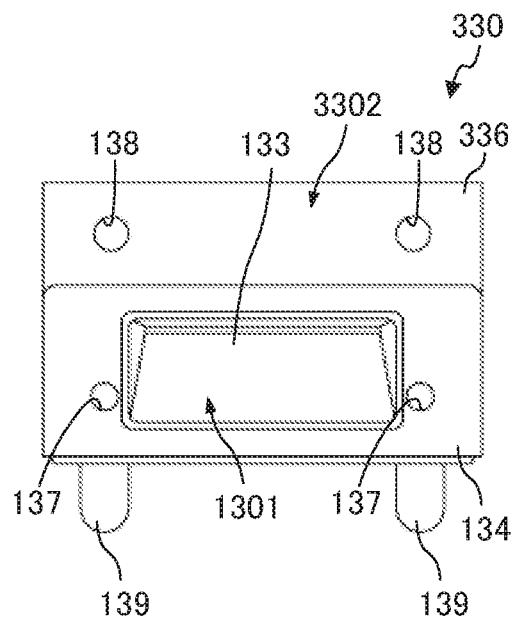
FIGS. 8A to 8D illustrate a configuration of an optical-receptacle main body according to Embodiment 3.
Figure 8B:
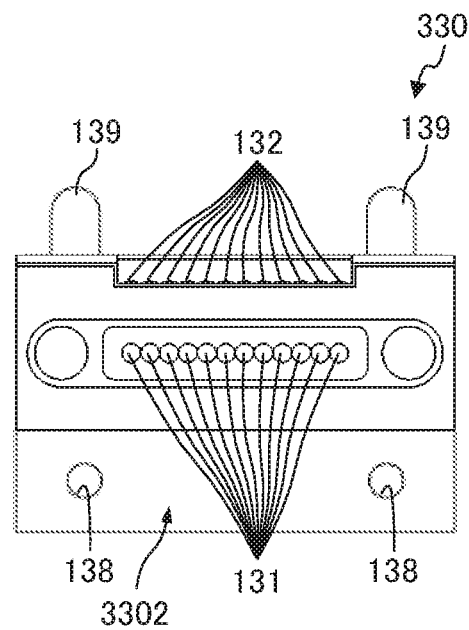
Figure 8C:
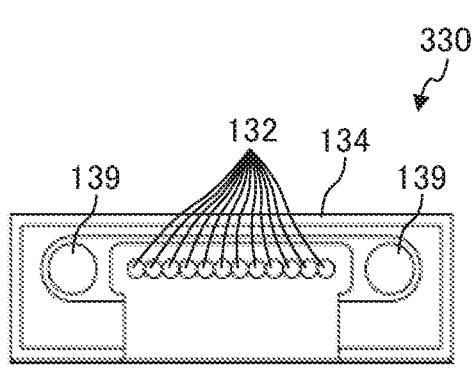
Figure 8D:
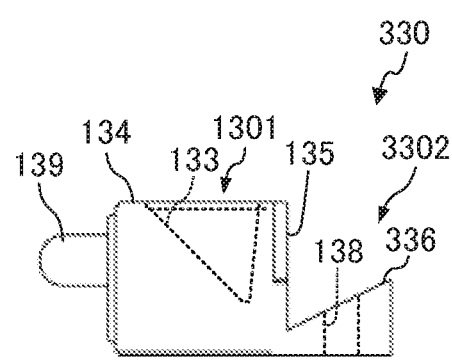

FIGS. 8A to 8D illustrate the configuration of optical-receptacle main body 330. FIG. 8A is a plan view of optical-receptacle main body 330, FIG. 8B is a bottom view of optical-receptacle main body 330, FIG. 8C is a front view of optical-receptacle main body 330, and FIG. 8D is a right side view of optical-receptacle main body 330.

First recess 1301 and second recess 3302 are formed in the top surface of optical-receptacle main body 330 sequentially from the side of the front surface of optical-receptacle main body 330. Second recess 3302 has a substantially quadrangular prism shape.

Optical-receptacle main body 330 includes twelve first optical surfaces 131, twelve second optical surfaces 132, reflective surface 133, first contacting surface 134, second contacting surface 135, third contacting surface 336, two first fitting portions 137, two adhesion through holes 138, and two ferrule protrusions 139.

Optical-receptacle main body 330 is adhered, via adhesive 10 disposed inside adhesion through holes 138 and adhesion recesses 148, to supporting member 340 to be in contact with supporting member 340 at first contacting surface 134, contacting surface 135, and third contacting surface 336 and to be spaced apart from an imaginary plane (surface of substrate 111) including installation surface 146 of supporting member 340.

Third contacting surface 336 is the bottom surface of second recess 3302 formed in the top surface of optical-receptacle main body 330. Third contacting surface 336 is disposed opposite the surface on which first optical surfaces 131 are disposed (bottom surface of optical-receptacle main body 330). Third contacting surface 336 is in contact with the inner surface of supporting member 340. Third contacting surface 336 is in contact with the top surface of protrusion 3411 (see FIG. 9A) formed on the inner surface of supporting member 340 in the present embodiment. Third contacting surface 336 is not parallel to first contacting surface 134 in the present embodiment. More specifically, third contacting surface 336 is inclined such that a distance to third contacting surface 336 from the surface on which first optical surfaces 131 are disposed increases with increasing distance from the surface on which second optical surfaces 132 are disposed.

FIGS. 9A to 9D illustrate a configuration of supporting member 340. FIG. 9A is a bottom view of supporting member 340, FIG. 9B is a front view of supporting member 340, FIG. 9C is a right side view of supporting member 340, and FIG. 9D is a sectional view of supporting member 340 taken along line D-D in FIG. 9A.

Supporting member 340 supports optical-receptacle main body 330, with substrate 111 and optical-receptacle main body 330 being spaced apart from each other. Supporting member 340 is in contact with first contacting surface 134, second contacting surface 135, and third contacting surface 336 of optical-receptacle main body 330 in the present embodiment.

Supporting member 340 is composed of top plate 341, right side plate 142, left side plate 143, front plate 144, and rear plate 145 in the present embodiment.

Top plate 341 is disposed in the region covering one of openings defined by right side plate 142, left side plate 143, front plate 144, and rear plate 145. One surface of top plate 341 (inner surface of supporting member 340) is in contact with a part of the top surface of optical-receptacle main body 330. The shape of the one surface of top plate 341 is not limited specifically as long as top plate 341 can come into contact with the top surface of optical-receptacle main body 330. The shape of the one surface of top plate 341 corresponds to the shape of the top surface of optical-receptacle main body 330. Protrusion 3411 is formed on the one surface of top plate 341 in the present embodiment. The surface of protrusion 3411 on the side of the front surface of optical-receptacle main body 330 is in contact with the side surface of second recess 1302 of optical-receptacle main body 330 (the side surface is second contacting surface 135) in the present embodiment. The shape of the top surface of protrusion 3411 corresponds to the shape of third contacting surface 336. That is, the top surface of protrusion 3411 is inclined such that a distance to the top surface of protrusion 3411 from the surface on which first optical surfaces 131 are disposed increases with increasing distance from the surface on which second optical surfaces 132 are disposed. Supporting member 340 can thus support optical-receptacle main body 330, with the top surface of optical-receptacle main body 330 and the inner surface of supporting member 340 being in contact with each other.

(Effect)

As described above, optical receptacle 320 and optical module 300 according to Embodiment 3 also have the same effects as Embodiment 1. In optical receptacle 320 according to Embodiment 3, third contacting surface 336 is inclined such that a distance to third contacting surface 336 from the surface on which first optical surfaces 131 are disposed increases with increasing distance from the surface on which second optical surfaces 132 are disposed. Thus, in the process step of adhering optical-receptacle main body 330 to supporting member 340 in Embodiment 3, such inclination can cause the adhesive never to flow toward second contacting surface 135 but to flow toward the rear surface of optical-receptacle main body 330 even when the adhesive flows in between optical-receptacle main body 330 and supporting member 340 at the time of injection of the adhesive into adhesion through holes 138 and adhesion recesses 148. Consequently, optical-receptacle main body 330 and supporting member 340 can be assembled with high accuracy.

The present patent application claims the benefit of priority based on Japanese Patent Application No. 2016-232527 filed on Nov. 30, 2016. The disclosure of the specification, drawings and abstract of the Japanese Patent Application is incorporated in the specification of the present application by reference in its entirety.

INDUSTRIAL APPLICABILITY

The optical receptacle and optical module according to the present invention are useful for optical communications using an optical transmission member, for example.

REFERENCE SIGNS LIST

10 Adhesive
100, 300 Optical module
110 Photoelectric conversion device
111 Substrate
112 Photoelectric conversion element
120, 120a to 120c, 320 Optical receptacle
130, 230, 303 Optical-receptacle main body
1301 First recess
1302, 3302 Second recess
2303 Cutout
131 First optical surface 132 Second optical surface
133 Reflective surface
134 First contacting surface
135 Second contacting surface
136, 336 Third contacting surface
137 First fitting portion
138, 138a to 138c Adhesion through hole
139 Ferrule protrusion
140, 240, 340 Supporting member
141, 241, 341 Top plate
142 Right side plate
143 Left side plate
144 Front plate
145 Rear plate
146 Installation surface
147 Second fitting portion
148, 148a to 148c Adhesion recess
1441 Opening
1411, 3411 (First) Protrusion
2412 Second protrusion
150 Optical transmission member

What is claimed is:

1. An optical receptacle to be disposed between a photoelectric conversion device and an optical transmission member, the photoelectric conversion device including a substrate and a photoelectric conversion element disposed on the substrate, the optical receptacle being configured to optically couple together the photoelectric conversion element and an end surface of the optical transmission member, the optical receptacle comprising:
   an optical-receptacle main body that includes a first contacting surface, a second contacting surface, and a third contacting surface disposed sequentially from a side of a surface of the optical-receptacle main body facing the end surface of the optical transmission member; and
   a supporting member that supports the optical-receptacle main body while being in contact with the first contacting surface, the second contacting surface, and the third contacting surface,
   wherein the optical-receptacle main body includes:
   a first optical surface that allows incidence of transmission light emitted by the photoelectric conversion element, or emits, toward the photoelectric conversion element, reception light that has been emitted from the end surface of the optical transmission member and has passed through an inside of the optical-receptacle main body,
   a second optical surface that emits, toward the optical transmission member, the transmission light that has been emitted by the photoelectric conversion element and has passed through the inside of the optical-receptacle main body, or allows incidence of the reception light emitted from the optical transmission member,
   a reflective surface that reflects, toward the second optical surface, the transmission light incident on the first optical surface, or reflects, toward the first optical surface, the reception light incident on the second optical surface,
   a first fitting portion disposed in or on the first contacting surface, and
   an adhesion through hole that is open in the third contacting surface and in a surface of the optical-receptacle main body located opposite the third contacting surface,
   wherein the first contacting surface and the third contacting surface are disposed opposite a surface of the optical-receptacle main body on which the first optical surface is disposed,
   wherein the second contacting surface is disposed opposite a surface of the optical-receptacle main body on which the second optical surface is disposed,
   wherein the supporting member includes:
   an installation surface for installation on the substrate,
   a second fitting portion disposed on or in a surface of the supporting member facing the first contacting surface, the second fitting portion being fitted in or to the first fitting portion, and
   an adhesion recess that is open in a surface of the supporting member facing the third contacting surface, the adhesion recess communicating with the adhesion through hole, and
   wherein the optical-receptacle main body is adhered to the supporting member to be spaced apart from an imaginary plane including the installation surface, the optical-receptacle main body being adhered to the supporting member via an adhesive disposed inside the adhesion through hole and the adhesion recess.

2. The optical receptacle according to claim 1, wherein the reflective surface is disposed between the surface on which the second optical surface is disposed and the second contacting surface.

3. The optical receptacle according to claim 1 or 2, wherein
   a size of an opening of the adhesion through hole on a side of the third contacting surface and a size of an opening of the adhesion recess are different from each other.

4. The optical receptacle according to claim 1 or 2, wherein
   a portion of the adhesion through hole including an opening of the adhesion through hole on a side of the third contacting surface has a tapered shape in which a size of the adhesion through hole becomes smaller toward the third contacting surface from the surface located opposite the third contacting surface, and
   a size of an opening of the adhesion recess is equal to or smaller than the size of the opening of the adhesion through hole on the side the third contacting surface.

5. The optical receptacle according to claim 1, wherein the third contacting surface is inclined such that a distance to the third contacting surface from the surface on which the first optical surface is disposed increases with increasing distance from the surface on which the second optical surface is disposed.

6. An optical module, comprising:
   a photoelectric conversion device including a substrate and a photoelectric conversion element disposed on the substrate; and
   the optical receptacle according to claim 1, wherein the substrate and the optical-receptacle main body are spaced apart from each other.

7. A method for producing the optical module according to claim 6, the method comprising:
   adhering the optical-receptacle main body and the supporting member to each other by injecting an adhesive inside the adhesion through hole and the adhesion recess, and curing the adhesive, with the optical-receptacle main body being in contact with the supporting member at the first contacting surface, the second contacting surface, and the third contacting surface; and fixing the optical receptacle and the substrate to each other, with the substrate and the optical-receptacle main body being spaced apart from each other.

* * * * *